United States Patent
Shinohara et al.

[11] Patent Number: 5,866,671
[45] Date of Patent: Feb. 2, 1999

[54] MOLDED PARTS USED FOR PHOTOGRAPHIC SENSITIVE MATERIALS AND RESIN COMPOSITIONS USED TO MAKE THEREOF

[75] Inventors: Kenichi Shinohara, Yokahama, Japan; Robert J. Kassal, Wilmington, Del.; Osamu Suzuki; Takashi Yoneyama, both of Kanagawa, Japan

[73] Assignee: E. I. Du Pont de Nemours and Company, Wilmington, Del.

[21] Appl. No.: 776,420

[22] PCT Filed: Aug. 1, 1995

[86] PCT No.: PCT/US95/09798

§ 371 Date: Jan. 30, 1997

§ 102(e) Date: Jan. 30, 1997

[87] PCT Pub. No.: WO96/04591

PCT Pub. Date: Feb. 15, 1996

[30] Foreign Application Priority Data

Aug. 1, 1994 [JP] Japan .................................. 6-179908

[51] Int. Cl.$^6$ ...................................................... C08G 4/00
[52] U.S. Cl. .................................. 528/243; 528/23; 43/56
[58] Field of Search ........................... 528/23, 243; 43/56

[56] References Cited

U.S. PATENT DOCUMENTS 3,333,520  8/1967  McGivney ................................. 95/11
4,127,382  11/1978  Perry ........................................... 8/181

FOREIGN PATENT DOCUMENTS

| 0043036 | 8/1982 | European Pat. Off. . |
| 0244245 | 11/1987 | European Pat. Off. . |
| 0583778 | 2/1994 | European Pat. Off. . |
| 0658809 | 6/1995 | European Pat. Off. . |
| 3-034548 | 2/1992 | Japan . |
| 6-107900 | 4/1994 | Japan . |
| 996252 | 6/1965 | United Kingdom . |
| 1320452 | 6/1973 | United Kingdom . |

OTHER PUBLICATIONS

PCT International Search Report (PCT/US 95/09798).

G. Deraedt "Methods of abating residual formaldehyde in industrial resins" 1988, Pergamon Press, Oxford GB see abstract US 4127382 (Perry R.S.) see p. 20.

see abstract EP 43036 (Vianova Kunstharz) see p. 52.

*Primary Examiner*—Duc Truong

[57] ABSTRACT

A novel resin composition for use in applications requiring low formaldehyde concentration levels. The novel composition comprising a stabilized polyacetal polymer with capped end groups is characterized by the concentration of formaldehyde generated from a formed object of the said composition in a closed environment being less than 20 ppm.

12 Claims, 3 Drawing Sheets

MOLDED PARTS USED FOR PHOTOGRAPHIC SENSITIVE MATERIALS AND RESIN COMPOSITIONS USED TO MAKE THEREOF

BACKGROUND OF THE INVENTION

1. Industrial Use Field

This invention pertains to molded parts used for photographic sensitive materials and resin compositions used to make such parts as magazines which house photographic sensitive materials like photo-film and printing paper or springs and rollers that are used around the photographic sensitive materials.

2. Existing Technology

Polyacetal resin which is a thermoplastic resin is used as a molding composition for machine bearings, gear wheels, rollers, cams, clips and plate springs because of its excellent mechanical properties, heat resistance, friction resistant and anti-abrasion properties and fatigue resistance property. However, a small amount of the monomer formaldehyde is dissolved in molded parts made of the polyacetal resin and its slow release into the air causes deterioration of work environment and compromized work efficiency and, in some cases, may lead to harmful result to the end use objective. For example, because chemically active formaldehyde is present, the polyacetal resin causes some concern to be used as food and medical packaging material.

Also, it is known that formaldehyde has detrimental effect on photographic sensitive materials such as photographic film and printing paper. While a silver halide emulsion is used in these photographic sensitive materials, formaldehyde has the ability to reduce silver halides, resulting in chemical fogging. Therefore, polyacetal resins, in general, cannot be used as a resin composition of magazines that receive photographic sensitive materials and various molded parts that are used around them. Consequently, metals are often used to make parts that require sufficient elasticity such as a film pressing board.

Considering these situations and in order to reduce concentrations of formaldehyde gas in the molded parts made of acetal resin, Japanese Kokai 1992-34548 describes hydrazide compounds to be used as an additive, and Japanese Kokai 1994-107900 describes the use of fatty acid ester of polyvalent alcohol compound as an additive.

Problems that Invention Attempts to Solve

But, when a hydrazide compound is added as an additive to polyacetal resin, there is a certain danger of its byproduct, hydrazine itself, functioning as a reducing agent of photographic sensitive materials. Also, when a fatty acid ester of polyvalent alcohol compound is used as an additive, its effect to suppress formaldehyde is not sufficiently and practical problems persist for its use as a resin composition to make molded parts for photographic sensitive materials.

SUMMARY OF THE INVENTION

Resin compositions used to make parts for photographic sensitive materials, which are polyacetal resin compositions and are characterized by the concentration of formaldehyde generated from a formed object of the said composition in a closed environment being less than 20 ppm and by not compromizing with their photographic properties.

This invention is to solve the problems described above and aims at making polyacetal resins that possess excellent characteristics in mechanical properties, heat resistance and fatigue resistance suitable to be a resin composition material to make molded parts used for photographic sensitive materials.

DETAILED DESCRIPTION

Method to Solve Problems

In order to achieve the above objective, this invention is to use polyacetal resin, as a resin composition to make molded parts for photographic sensitive materials, which is prepared in such a way that the concentration of formaldehyde formed from the molded parts remain below 20 ppm in a sealed vessel, without negatively affecting the photographic quality. Concentration of formaldehyde gas generated from molded parts made of this type of polyacetal resins is extremely small and no chemical fogging due to reduction of silver halide emulsions can be seen. Also, since it is designed not to produce harmful chemicals that may negatively affect the photography, it is ideally suited to be used as a resin composition used to make molded parts for photographic sensitive materials.

Furthermore, in cases that an antioxidant is to be added to the above polyacetal resin in order to prevent thermal deformation due to oxidation during heating, a hindered phenol type antioxidant may be used in the range of 0.001~1.0 weight % to effectively suppress the generation of formaldehyde gas. Whereas below 0.001 weight % little effect is observed, above 1.0 weight % not only photography is negatively affected but physical properties also deteriorate. Also, the addition of a light-shielding material in the range of 0.5~25 weight % improves the shading ability necessary for the molded parts to be used around photographic sensitive materials, without compromising the chemical and physical properties of the polyacetal resin. Below 0.05 weight %, light-shielding power cannot be secured and the objective to add the additive cannot be met, but also it means an operating loss. Above 25 weight %, the physical strength deteriorates and the appearance also suffers.

Figure 1:
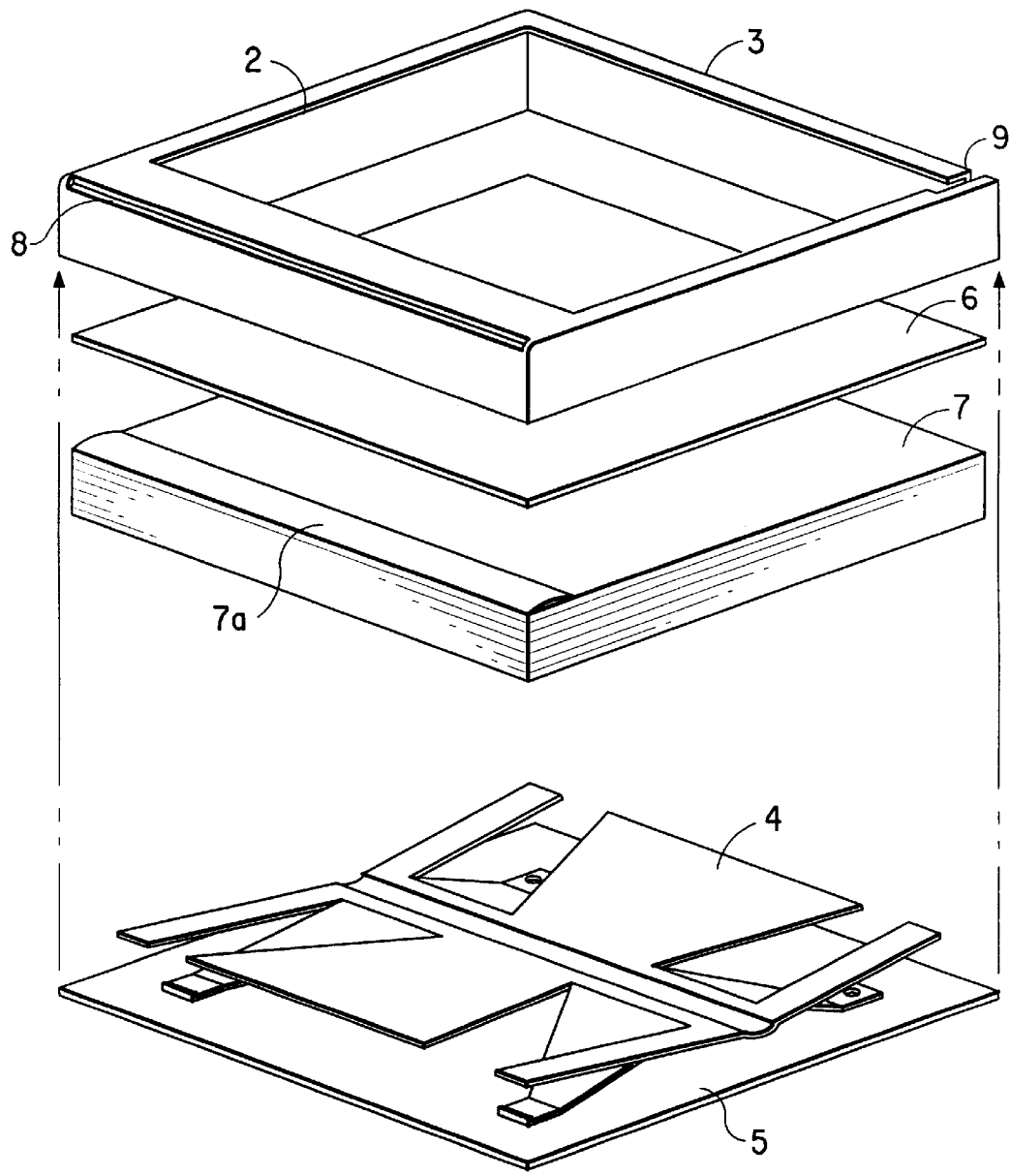
FIG. 1 is a schematic perspective view of an instant film pack used in the invention.

In FIG. 1, a film pack made of the polyacetal resin composition of this invention is briefly described. The pack main-body consists of a box-shape casement 3 forming an exposure opening 2 and a bottom lid 5 to which a plate spring 4 is attached. In the casement are stored a light-shielding sheet 6 and about 10 sheets of mono-sheet type instant film units 7. Whereas the polyacetal resin of this invention can be used as the composition material for the casement 3, the plate spring 4, the bottom lid 5 and the light-shielding sheet 6, some appropriate parts of these may be made of a polystyrene resin and other resins.

In addition to the exposure opening 2, the casement 3 has an exit slot 8 and a notch 9 through which a raking claw inserts. As a bottom lid 5 is fastened to the bottom of the casement 3, a plate spring 4 pushes up the instant film units 7 and shade sheet 6 stored in the pack main body so that the shade sheet 6 covers the exposure opening 2 from the inside of the casement 3. Hereby, the instant film units 7 in the pack main body can be kept from the light. Further, the exit slot 8 is covered by flexible shade film.

The instant film unit 7 is fitted with a developer pod 7 in which a developing solution is enclosed. A film pack is loaded into a camera and photographing is ready once the shade sheet 6 is ejected. When a picture is taken, a raking claw mounted in the camera insert itself through the notch 9 to scrape out the instant film unit 7, that has been just exposed through the exposure opening 2, through the exit slot 8. After this, developer rollers located inside the camera rotate as they squeeze the exposed instant film unit 7 coming out of the exit slot 8 and squash the developer pod 7a as the film unit is ejected.

The plate spring 4 is to press the top unit of the instant film units 7 stored in the pack main body against the internal side of the exposure opening 2 and to position the instant film unit 7 to be used for the next photographing in the exposure position. Therefore, especially if the plate spring is to be made of a resin, the resin must have sufficient elasticity as well as such characteristics that the elasticity is not lost after prolonged storage.

Resin compositions of this invention, even if used as a molding composition to make the plate springs described above, have enough elasticity as well as a characteristic that gives rise to little creep deformation. Although resin compositions of this invention use a polyacetal resin as monomers, the polyacetal resins herein used are commonly used polyacetal resins which are polymers or copolymers of aldehydes, for example, formaldehyde and formaldehyde cyclic oligomers such as trioxane, tetraoxane etc., or polymers prepared by copolymerization of these aldehydes with cyclic ethers or cyclic acetals, for example, ethylene oxide, propylene oxide, 1,3-dioxolane etc.

The polyacetal resin has the main chain consisting of $-(CH_2O)_n-$ unit (n is a natural number) and/or $-(CHR-O)_n-$ unit (R is alkyl: n is a natural number) and is a linear polymer with end groups either unprotected or protected by groups such as $-OCOCH_3$, $-OCH_3$, $-OCH_2-OH$ and with the number averaged molecular weight of 10,000~100,000, preferably 18,000~70,000.

In order to lower the concentration of formaldehyde gas liberated from polyacetal resins, it is preferred to add to 100 weight parts of polyacetal resin 0.05~3.0 weight parts, preferably 0.06~2.0 weight %, more preferably 0.067~1.0 weight % of organic cyclic compound with active imino group shown in a general formula (I). Here, $R^1$, $R^2$, $R^3$ in the general formula (I) represent divalent organic radicals forming through their covalent bondings a cyclic organic compound.

Chem. 1
General Formula (I)

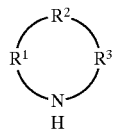

It is desirable that the active imino compound has its imino group highly reactive so that, during and even after the polyacetal resin has crystallized and solidified, it can still react with formaldehyde to form the methylol group as shown in the reaction formula (II).
Chem. 2

Reaction Formula (II)

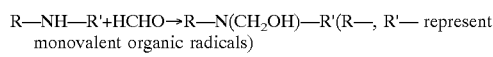

In order for the imino group to possess such reactivity, the electron density at the imino group must be sufficiently low sic to fulfill the conditions to induce nucleophilic reactions. Accordingly, organic radicals directly linked to the imino group by a chemical bond must be of electron withdrawing. Such organic radicals, namely organic radicals $R^1$, $R^2$, $R^3$ in the above formula (I), should preferably possess, at the position linked to the imino group, $-CO-$, $-COO-$, $-NH-$, $-NH_2$, phenyl group, biphenyl group, naphthalene group etc.

Furthermore, if a chemical is to be added to polyacetal resin, it is essential that such a chemical does not separate out by melt mixing or thermally decompose. Thus, hydantoins and imidazole derivatives may be good examples of compounds represented by the formula (I). In this invention, hydantoin type compounds are preferred. Hydantoin compounds may include but not necessarily be limited to hydantoin, 5,5-dimethylhydantoin, 5,5-diphenylhydantoin and allantoin.

To the acetal resin composition used in this invention, one may add a lubricant, a light-shielding material, an antioxidant, a heat stabilizer, appropriate plasticizers and fillers, if necessary, within the range not to negate the effects of this invention.

Representative lubricants that may be used for the acetal compositions of this invention will be listed below together with their makers.

(1) Silicone Type Lubricants
   Various grade dimethylpolysiloxanes and their modifications (Shin-etsu Silicone, Toray Silicone)
(2) Oleic Acid Amide Lubricants
   Armoslip CP (Lion-Akzo), Neutron (Nihon Seika), Neutron E-18 (Nihon Seika), Amide O (Nitto Chem.), AlfroF:10 (Nihon Yushi), DaiyamidC-200(Nihon Kasei) etc.
(3) Elka Acid Amide Type Lubricants
   Alfro-F-10 (Nihon Yushi) etc.
(4) Stearic Acid Amide Type Lubricants
   Alfro-S-10 (Nihon Yushi), Neutron2 (Nihon Seika), Diyamid200 (Nihon Kasei) etc.
(5) Bis-Fatty Acid Amide Type Lubricants
   Bisamide (Nihon Kasei), Diyamide200Bis (Nihon Kasei), Armowax BBS (Lion-Akzo) etc.
(6) Non-ionic Surfactant Type Lubricants
   Electro-Stripper-TS-2, Electro-Stripper-TS-8 (Kao Soap) etc.
(7) Hydrocarbon Type Lubricants
   Liquid Paraffin, Natural Paraffin, Microwax, Synthetic Paraffin, Polyethylene Wax, Polypropylene Wax, Chlorohydrocarbons, Fluorocarbons
(8) Fatty Acid Type Lubricants
   High Fatty Acids (Preferably higher than C sic), Oxy-Fatty Acid
(9) Ester Type Lubricants
   Lower Alcohol Esters of Fatty Acids, Polyvalent Alcohol Esters of Fatty Acids, Polyglycol Esters of Fatty Acids, Fatty Alcohol Esters of Fatty Acids
(10) Alcohol Type Lubricants
   Polyvalent Alcohols, Polyglycols, Polyglycerols
(11) Metal Soap
   Compounds of higher fatty acids such as lauric acid, stearic acid, ricinolic acid, naphthenic acid, oleic acid, etc. with metals such as Li, Mg, Ca, Sr, Ba, Zn, Cd, Al, Sn, Pb, or another metal.

Also, as shading compounds to be added to secure the light-shielding property the followings may be cited.

(1) Inorganic Compounds

A. Oxides: silica, diatomaceous earth, alumina, Titanium oxide, iron oxides, zinc oxide, magnesium oxide, antimony oxide, barium ferrite, strontium ferrite, beryllium oxide, pumice, pumice balloon, alumina fiber B. Carbonate Salts: calcium carbonate, magnesium carbonate, dolomite C. Silicate Salts: talc, clay, mica, asbestos, glass fiber, glass balloon, glass beads, calcium silicate, montmorillonite, bentonite, etc.

D. Carbon: carbon black, graphite, carbon fiber, carbon hollow balls, etc.

E. Others: iron powder, copper powder, lead powder, tin powder, stainless steel powder, pearl pigment, aluminum powder, molybdenum sulfide, boron fiber, silicon carbon fiber, brass fiber, potassium titanate, lead titanate zirconate, zinc borate, barium metaborate, calcium borate, sodium borate, aluminum paste, talc. etc.

(2) Organic compounds

Wood meal (pine, oak, saw-dust, etc.), husk fiber (almond, peanuts, chaff, etc.), colored various fiber such as cotton, jute, paper piece, cellophane piece, nylon fiber, propylene fiber, starch, aromatic polyamide fiber, etc.

Among these shading materials, carbon black is preferred because the bleed-out amount can be reduced. The following classes of carbon black are especially preferred, gas black, furnace black, channel black, anthracene black, acetylene black, Ketchen carbon black, lamp black, lamp smoke, pine smoke, animal black, vegetable black, etc.

In this invention, furnace carbon black is preferred for reasons of shading power, the cost and improvement of physical properties, whereas as for shading material with the ability to prevent electric charge build-up acetylene carbon black and modified synthetic carbon black such as Ketchen carbon black are preferred. Depending upon the requirement, it may be desirable to mix the former with the latter to obtain desired characteristics.

Whereas there are various modes to mix shading substance, a master batch method is preferred because of the cost, pollution invention, etc. Japanese Kokai 1965-26196 describes a method to prepare a master batch of polymer-carbon black by dispersing carbon black into a solution of polymer dissolved in organic solvent, and Japanese Kokai 1968-10362 describes a method to prepare a master batch by dispersing carbon black into polyethylene.

To be used to make molded parts for photographic sensitive materials in this invention, carbon black of pH 6.0~9.0 with average powder diameter of 10~120 $\mu$m is preferred because little fogging shows up on photographic sensitive materials, because photosensitivity does not change much and because lumps of carbon black as well as pinholes due to fish-eyes hardly appear even when it is added to the resin composition of this invention. Among the carbon black, furnace carbon black having especially volatile components less than 2.0% and oil absorption greater than 50 ml/100 g is preferred. Channel carbon black, in addition to being expensive, often produces fogs on photographic sensitive materials and, therefore, is not preferred. Even if it must be used for some reason, effects onto the photography should be investigated before it is selected.

The following carbon black on the market may be preferred; Mitsubishi Kasei Carbon Black #20 (B), #30 (B), #33 (B), #40 (B), #44 (B), #45 (B), #50, #55, #100, #600, #2200 (B), #2400 (B), MA 8, MA 11, MA 100.

As imported products may be cited, for example, Cabot Co.'s Black Pearls 2, 46, 70, 71, 74, 80, 81, 607, etc., Regal 300, 330, 400, 660, 991, SRF-S, etc., Vulcan 3, 6, etc., Sterling 10, SO, V, S, FT-FF, MT-FF, etc. Further cited may be Ashland Chemicals' United R, BB, 15, 102, 3001, 3004, 3006, 3007, 3008, 3009, 3011, 3012, XC-3016, XC-3017, 3020; but not limited to the ones listed above.

The amount of shading material to be added should be in the range of 0.05~25 weight %, preferably 0.1~15 weight %, more preferably 0.5~10 weight %, and most preferably 1.0~7.0 weigh %.

Also, it is desirable to add antioxidant to prevent thermal deterioration of the resin and to suppress the formation of fish-eyes and lumps (non-homogeneous lump breakdown). Hindered phenol type antioxidants are most preferred in this invention and are listed below.

1,3,5-trimethyl-2,4,6-tris(3,5-di-tert-butyl-4-hydroxybenzyl)benzene, tetrakismethylene-3-(3', 5'-di-tert-butyl-4'-hydroxyphenyl)propionate methane, octadecyl-3,5-di-tert-butyl-4-hydroxy-hydrocinnamate, 2,2',2'-tris(3,5-di-tert-butyl-4-hydroxyphenyl)propionyloxyethyl isocyanurate, 1,3,5-tris(4-tert-butyl-3-hydroxy-2,6-dimethylbenzyl)isocyanurate, tetrakis(2,4-di-tert-butylphenyl) 4,4'-biphenylene diphosphite ester.

4,4'-Thio-bis(6-tert-butyl-O-cresol), 2,2'-thio-bis(6-tert-butyl-4-methylphenol), tris(2-methyl-4-hydroxy-5-tert-butylphenyl)butane, 2,2'-methylene-bis(4-methyl-6-tert-butyl-phenol), 4,4'-methylene-bis(2,8-di-tert-butylphenol), 4,4'-butylidene-bis(3-methyl-6-tert-butyl-phenol), 2,6-di-tert-butyl-4-methylphenol, 4-hydroxymethyl-2,6-di-tert-butylphenol, 2,6-di-tert-butyl-4-n-butylphenol.

2,6-Bis(2-2'-hydroxy-3'-tert-butyl-5'-methylbenzyl)-4-methylphenol, 4,4'-methylene-bis(6-tert-butyl-O-cresolsic, 4,4'-butylidene-bis(6-tert-butyl-m-cresol), 3,9-bis{1,2-dimethy-2b-(3-tert-butyl-4-hydroxy-5-methylphenyl) propionyloxyethyl}2,4,8,10-tetraoxaspiro5,5undecane may be listed. Among these, those with melting point higher than 100° C., especially above 120° C., are preferred. As to the amount of these hindered phenol type antioxidants to be added, 0.001~1.0 weight % is the range, preferably 0.005~0.8 weight %, more preferably 0.01~0.5 weight %, and most preferably 0.02~0.4 weight %.

Further, as for the heat stabilizer to be added to the resin composition of this invention there are polyamide compounds, especially nylon terpolymers, hydroxy containing polymers such as those described in U.S. Pat. No. 4,776,168 and 4,814,397, and nonmelting nitrogen or hydroxy containing compounds described in Europe Patent Publication 0388809. More concretely, these are polyamide 6, polyamide 6/12 copolymer, polyamide 6/66/610 terpolymer, polyamide 6/66/612 terpolymer, ethylene-vinyl alcohol copolymer, acrylamide (co)polymer, acrylamide/N, N-methylenebis-acrylamide copolymer. In general, the total amount of heat stabilizers to be added to the polyacetal resin composition is 0.5~5.0 weight parts to 100 weight parts of acetal resin, preferably 0.05~1.50 weight parts.

Molded parts of these polyacetal resin compositions may be formed by any molding method including compressed molding, ejection molding, extrusion molding, blow molding, rotary molding, melt spinning, and heat molding. Especially preferred for obtaining parts pertaining to this invention is ejection molding.

EXAMPLES

Below, concrete examples of this invention are described together with comparative examples, but this invention is not limited to those examples mentioned here.

Polyacetal resins used in the following Practical Examples are DuPont's high flow grade polyacetal-homopolymers, Delrin® 900 PNC 10 (Trade Name: Melt Index 11.5 g/min) and Delrin® 1700 PNC 10 (Trade Name: Melt Index 18.0 g/min). The followings are prepared for additives to be added to prevent oxidation during resin heating and for the purpose of reducing evolution of formaldehyde gas.

Additive 1: Hydantoin (Mitsui Toatsu)

Additive 2: 5,5-dimethylhydantoin (Mitsui Toatsu)

Additive 3: Adipic acid hydrazide (Nihon Hydrazine Ind.)

Additive 4: Stearic acid monoglyceride (Riken Vitamin)

(1) Practical Example A

Delrin® 900 PNC 10 (5000 g) and Delrin 900 PNC 10 (5000 g) mixed with 25 g of one of the above listed Additives 1~4 are fed to a 35 mm biaxial screw ejection molder to melt mix and cut to obtain 5 different kinds of resins in the form of pellets. In this process, the resin temperature was 195°~198° C. and the feed rate was about 30 kg/hr. Each resin pellet is molded using a 75 Ton Sumitomo Nestal Ejection Molder to obtain 5 kinds of cylindrical test pieces A-1~A-5. During the molding the resin temperature and mold temperature was 250° C. and 75° C., respectively.

The test pieces A-1~A-5 thus prepared are placed and sealed, 5 pieces together (the total weight about 5 g), in a 1 L polyethylene container and allowed to stand at room temperature for 24 hours. Concentration of formaldehyde in the container was measured using Formalde Meter—MarkII (Lion Co. England) to the ppm level. Results are shown in Table 1.

TABLE 1

| TEST PIECE | ADDITIVE | ADDED AMOUNT (WT %) | FORMALDEHYDE CONCENTRATION | HYDRAZIDE EVALUATION | HALATION EVALUATION |
|---|---|---|---|---|---|
| A-1 | Additive 1 | 0.06 | 15.8 | ○ | ○ |
| A-2 | Additive 2 | 0.06 | 10.0 | ○ | ○ |
| A-3 | Additive 3 | 0.06 | 13.4 | △ | △ |
| A-4 | Additive 4 | 0.06 | 23.7 | ○ | X–△ |
| A-5 | none | — | 69.8 | ○ | X |

As Table 1 shows, all the additives exhibited observable effects in reducing the formaldehyde concentration in the molded parts. Among them, the most effective was Additive-2. Observable but insufficient effects can be seen with a fatty acid type additive, Additive-4. With Additive-3, formaldehyde concentration can be suppressed to the level below 15 ppm but hydrazine is slowly released, which reduces photographic sensitive materials and negatively affects the quality of photography, in addition to being harmful to human body. Thus, the column of Hydrazide Rating shows the degrees of effects that the hydrazide compound included in those test pieces exerts. Also, on the basis of concentrations of formaldehyde, the extent of fogging on photographic sensitive materials are shown in the column of Fogging Rating. The marks in these rating columns indicate: Open circle: good. Filled circle: practical possible uses. Filled triangle: improvement required. X: not suitable for practical uses.

(2) Practical Example B

To Delrin® 900 PNC 10 (9,800 g) is added 200 g of Additive-2, melt mixed through a 35 mm biaxial screw extrusion molder (Toshiba TEM 35) and cut to prepare Additive-2 concentrate in the form of pellets (a master batch). During this process, the resin temperature was 200° C. and the feed rate was 25 kg/hr. The Additive-2 concentrate thus obtained is called Additive-A.

In the manner similar to that used in Practical Example (1), cylindrical test pieces B-1~B-7 were prepared using mixtures prepared from High Flow Delrin® D1700 PNC 10 pellets and Additive-A in different ratios. Here, Test Piece B-1 is a sample which does not contain Additive-A. Using these test pieces B-1~B-7, formaldehyde concentrations were measured under the conditions identical with those used in Practical Example A. Results are shown in Table 2.

TABLE 2

| TEST PIECE | D1700P (WT %) | ADDITIVE A (WT %) | CONCENTRATION OF ADDITIVE 2 (WT %) | HYDRAZIDE EVALUATION | HALATION EVALUATION |
|---|---|---|---|---|---|
| B-1 | 100.0 | 0.00 | 0.00 | 69.8 | X |
| B-2 | 98.0 | 2.00 | 0.04 | 35.6 | X–△ |
| B-3 | 97.5 | 2.50 | 0.05 | 18.6 | ⊕ |
| B-4 | 97.0 | 3.00 | 0.06 | 10.0 | ○ |
| B-5 | 96.7 | 3.33 | 0.067 | 4.2 | ○ |
| B-6 | 95.0 | 5.00 | 0.10 | 4.6 | ○ |
| B-7 | 90.0 | 10.00 | 0.20 | 4.3 | ○ |

As Table 2 shows, it is clear that Additive-2 must be added more than 0.05 weight % in order to reduce the formaldehyde concentration in molded parts below such a level that no fogging shows up on photographic sensitive materials. However, if concentration of hydrazine in Additive-2 becomes too high, it functions as a reducing agent to photographic sensitive materials and becomes, also, harmful to human body. Thus, the amount of Additive-2 to be added should be maintained in the range of 0.05~3.0 weight %, preferably 0.06~2.0 weight % and most preferably 0.067~1.0 weight %. Furthermore, since the elasticity of molded parts is considerably reduced if concentration of Additive-2 exceeds 0.5 weight %, it may be problematic to use molded parts made of this resin as the material for springs.

(3) Practical Example C

Next, plate spring 4 shown in FIG. 1 was ejection molded using the composition identical with that used in Test Piece B-1~B-6 in Practical Example B. Various plate springs thus obtained were stored and sealed together with photographic sensitive materials in a dump-proof bag (humidity permeability: 0.5 g/m²/24 hr) at 50° C. for 3 days in a dry atmosphere. Here, FUJICOLOR NC-160 was used as photographic sensitive material.

Figure 2:
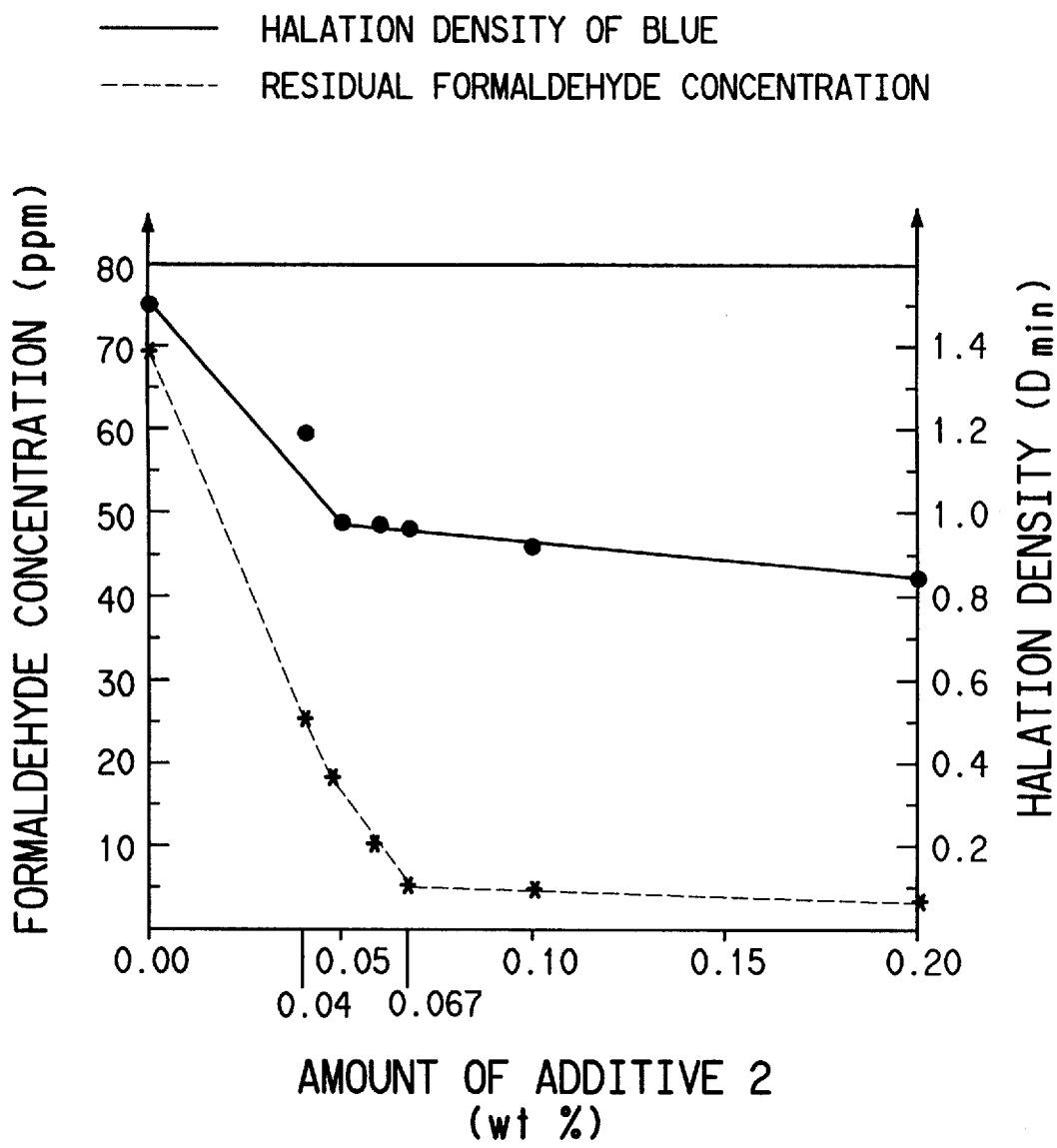
FIG. 2 is a graph showing a correlation of formaldehyde concentration and fogging concentration. Abscissa, left and right ordinates are for the amounts of Additive-2 (weight %), the formaldehyde concentration (ppm) and the fogging concentration (Dmin), respectively. The top solid plot is for the fogging concentration at blue and the lower broke line plot is for the residual formaldehyde concentration.

Then, the photographic sensitive materials were removed and developed to measure the fogging concentration, Dmin, at blue color where fogging is most pronounced. The fogging concentration Dmin represents the concentration difference relative to the concentration on a standard photographic sensitive material when the photographic sensitive material alone is allowed to stand for 3 days under the conditions identical with those described above. Table 3 summarizes the observed values and FIG. 2 shows the correlation with formaldehyde concentration measured in Practical Example B.

TABLE 3

| ADDED AMOUNT OF ADDITIVE 2 (WT %) | 0.00 | 0.04 | 0.05 | 0.06 | 0.067 | 0.10 | 0.20 |
|---|---|---|---|---|---|---|---|
| FORMALDEHYDE | 69.8 | 25.6 | 18.6 | 10.0 | 5.00 | 4.60 | 4.20 |

TABLE 3-continued

| CONCENTRATION (ppm) | | | | | | | |
|---|---|---|---|---|---|---|---|
| HALATION DENSITY ($D_{min}$) | 1.5 | 1.2 | 1.0 | 0.99 | 0.97 | 0.93 | 0.85 |

Graph in FIG. 2 shows that the concentration of chemical fogging caused by formaldehyde converges to the standard fogging concentration Dmin 0.8±0.2 in blank tests as long as the amount of Additive-2, which has the ability to trap formaldehyde, exceeds 0.067 weight %. Since, with this quantity range of the additive, the formaldehyde concentration can be maintained below 5 ppm and the fogging concentration can also be suppressed below 1.0, there should be no problem to use this material in the vicinity of photographic sensitive materials.

Figure 3:
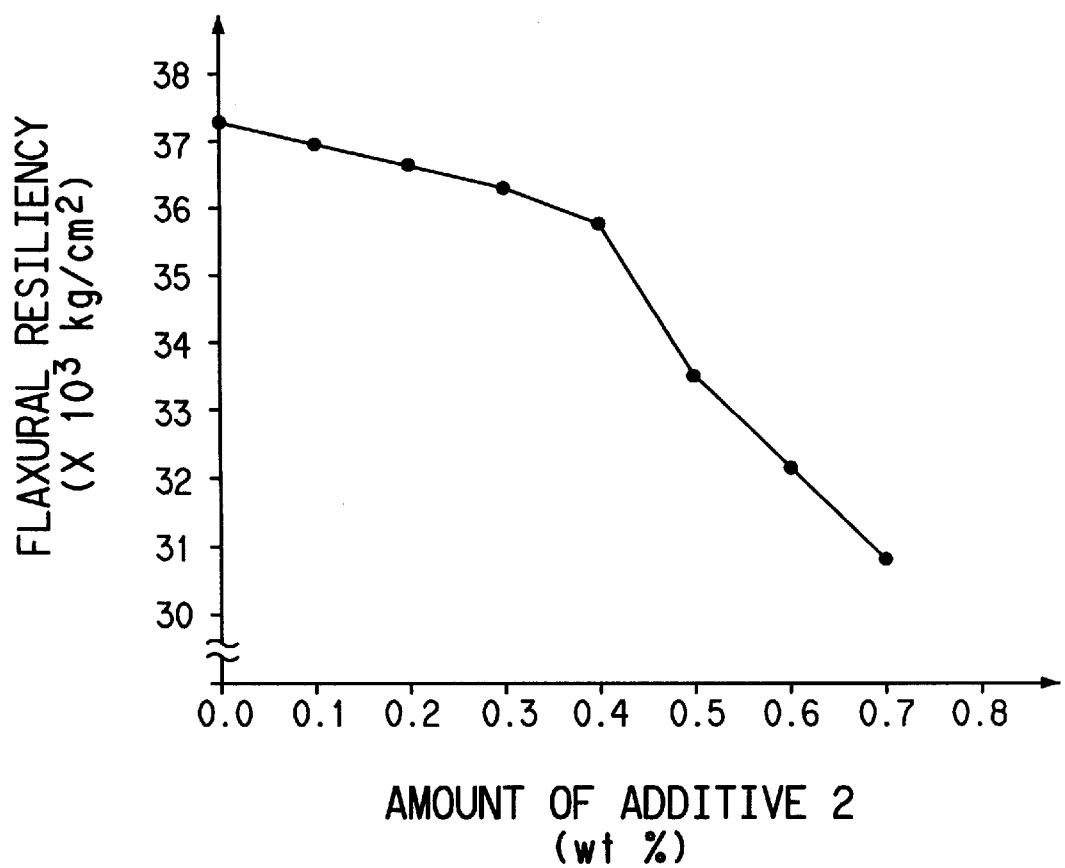
FIG. 3 is a graph showing a correlation between the amount of added 5,5-dimethylhydantoin and the bending elasticity. The abscissa is the amount of Additive 2 (weight %) and the ordinate is the bending elasticity (×10 kg/cm).

As described above, the effect of lowering formaldehyde concentrations by increasing the amount of Additive-2 has been confirmed, but the elasticity of molded parts decreases if too much is added. FIG. 3 shows the correlation between the amount of added Additive-2 and the bending elasticity of molded parts. As the graph shows, the bending elasticity significantly diminishes if Additive-2 is added more than 0.5 weight %. If the plate spring 4 shown in FIG. 1 is to be made of the polyacetal resin in this invention, it is desirable to use Additive-2 in the range lower than 0.5 weight %.

As shown above, if Additive-2 is added to the polyacetal resin to the extent of 0.05~3.0 weight %, preferably 0.06~2.0 weight %, the residual formaldehyde concentration can be greatly reduced, and even if it is used together with photographic sensitive materials, there is no danger that fogging on the photographic sensitive material becomes problematic. If Additive-2 is added in the range of 0.067~1.0 weight %, the bending elasticity of molded parts hardly diminishes and no problem should be encountered even if it is used to make springs.

The polyacetal resin of this invention with the characteristics described above can be used not only for magazines which store photographic sensitive materials like the film packs mentioned earlier, but also as various types of parts such as those used in production lines of photosensitive materials as well as sheet material, conveyer rollers and gears which may be used in cameras or near films and printing paper.

Further, the followings may represent suitable practicable modes to be included in this invention.

(1) Resin compositions used for making molded parts for photographic sensitive materials described in claim 1, comprising polyacetal resins and polyacetal resin compositions containing at least an organic cyclic compound bearing an active imino group.

(2) Resin compositions used for making molded parts for photographic sensitive materials described in claim 1, comprising polyacetal resins and polyacetal resin compositions containing at least a hydantoin compound.

(3) Resin compositions used for making molded parts for photographic sensitive materials described in claims 1~3 containing lubricant in 0.01~10 weight % or in one of the above mentioned practicable mode (1) or (2).

Effect of Invention

As explained above, since the polyacetal resin of this invention is prepared not to spoil photographic quality by maintaining concentration of formaldehyde generated in a closed vessel below 20 ppm, no chemical fogging takes place even if molded parts are used in the vicinity of photographic sensitive materials. In order to effectively reduce the concentration of formaldehyde generated from polyacetal resins, hindered phenol type compounds can be used as antioxidants to be added to the polyacetal resin and, by adjusting the amount to the 0.001~1.0 weight % range, fogging on photographic sensitive materials can be prevented. Further, suitable shading material may be added in the 0.5~25 weight % range, therby chemical fogging can be avoided with certainty.

Furthermore, since molded parts made of the resins prepared above cause neither chemical nor optical fogging on photographic sensitive materials, they can be used in various shapes such as magazines, sheets and rollers. Since sufficiently elastic parts, also, can be easily made, they may be used as materials to prepare springs.

The object of the invention is to provide a resin composition that reduces the concentration of formaldehyde generated from polyacetal resins and which does not bring about chemical fogging when it is used as parts for photographic sensitive materials. Composition 5,5-Dimethylhydantoin is added to polyacetal resin to trap formaldehyde generated from the polyacetal resin, thereby reducing the generation concentration of formaldehyde. The amount of 5,5-dimethylhydantoin to be added is 0.05~3.0 weight %, preferably 0.06~2.0 weight %, and most preferably 0.067~1.0 weight %.

We claim:

1. A novel resin composition for use in applications requiring low formaldehyde concentration levels, comprising:
   a) about 97 to about 99.95 weight percent of a stabilized polyacetal polymer with capped end groups; and
   b) about 0.05 to about 3 weight percent of an organic cyclic compound having an active imino group according to the formula:

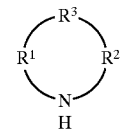

wherein $R^1$, $R^2$, and $R^3$ represent divalent organic radicals and said organic cyclic compound is selected from the group consisting of hydantoin derivatives and imidazole derivatives, and
   wherein a part molded from said resin produces an atmospheric formaldehyde concentration of less than about 20 ppm in an enclosed environment.

2. The resin composition of claim 1 wherein said stabilized polyacetal polymer is capped by the group consisting of —$OCOCH_3$, —$OCH_3$, and —$OCH_2CH_2OH$.

3. The resin composition of claim 1 wherein said organic cyclic compound is a hydantoin derivative selected from the group consisting of hydantoin, 5,5-dimethylhydantoin, 5,5-diphenylhydantoin, and allantoin.

4. The resin composition according to claims 1, 2, or 3 comprising about 0.05 to 3.0 weight percent of said organic cyclic compound.

5. The resin composition according to claims 1, 2, or 3 comprising about 0.06 to 2.0 weight percent of said organic cyclic compound.

6. The resin composition according to claims 1, 2, or 3 comprising about 0.067 to 1.0 weight percent of said organic cyclic compound.

7. The resin composition according to claims 1, 2, or 3 further comprising about 0.001 to 1.0 weight percent of a hindered phenol-type antioxidant.

8. The resin composition according to claims 1, 2, or 3 further comprising about 0.05 to 25 weight percent of a light-shielding material.

9. A molded part comprising the resin composition according to claims 1, 2, or 3.

10. The resin composition according to claim 8 further comprising about 0.5 to 5.0 weight percent of a thermal stabilizer selected from the group consisting of: a) a polyamide; b) a non-melting nitrogen-containing polymer compound; and c) a hydroxyl-containing polymer compound.

11. The resin composition according to claim 8 further comprising a filler selected from the group of: glass, fiber, carbon black or combinations thereof.

12. A method for reducing formaldehyde concentration in a closed environment from a molded part comprising a polyacetal resin composition, said method comprising:
   a) blending about 97 to about 99.95 weight percent of a stabilized polyacetal copolymer end-capped by —OCOCH3, —OCH3, or —OCH₂CH₂OH— group with about 0.05 to about 3 weight percent of an organic cyclic compound having an active imino group according to the formula:

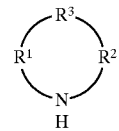

wherein $R^1$, $R^2$, and $R^3$ represent divalent organic radicals and said organic cyclic compound is selected from the group consisting of hydantoin derivatives and imidazole derivatives, and b) shaping said blend into a molded part by injection molding, blow molding, extrusion or coextrusion molding, compression molding, rotary molding, melt spinning, heat molding, or vacuum forming,
   wherein a part molded from said resin composition produces an atmoshpheric formaldehyde concentration of less than about 20 ppm in an enclosed environment.

* * * * *